United States Patent
Page (10) Patent No.: US 7,345,265 B2
(45) Date of Patent: Mar. 18, 2008

(54) ENHANCEMENT OF AIMPOINT IN SIMULATED TRAINING SYSTEMS

(75) Inventor: David Wayne Page, Cocoa, FL (US)

(73) Assignee: Cubic Corporation, San Diego, CA (US)

(*) Notice: Subject to any disclaimer, the term of this patent is extended or adjusted under 35 U.S.C. 154(b) by 256 days.

(21) Appl. No.: 11/183,250

(22) Filed: Jul. 15, 2005

(65) Prior Publication Data

US 2006/0073438 A1    Apr. 6, 2006

Related U.S. Application Data (60) Provisional application No. 60/521,877, filed on Jul. 15, 2004.

(51) Int. Cl.
*F42B 8/12* (2006.01)
*F41A 33/00* (2006.01)
*F41A 33/02* (2006.01)
*F41G 3/26* (2006.01)
*F42B 8/00* (2006.01)

(52) U.S. Cl. ................... 244/3.1; 434/11; 434/16; 434/19; 434/20; 434/21

(58) Field of Classification Search ........... 434/11–27; 244/3.1; 342/61–67
See application file for complete search history.

(56) References Cited

U.S. PATENT DOCUMENTS

| | | | | |
|---|---|---|---|---|
| 2,404,653 | A * | 7/1946 | Plebanek | 434/16 |
| 3,945,133 | A * | 3/1976 | Mohon et al. | 434/20 |
| 3,964,178 | A * | 6/1976 | Marshall et al. | 434/20 |
| 4,538,991 | A * | 9/1985 | Simpson et al. | 434/12 |
| 4,583,950 | A * | 4/1986 | Schroeder | 434/22 |
| 4,657,511 | A * | 4/1987 | Allard et al. | 434/20 |
| 4,923,402 | A * | 5/1990 | Marshall et al. | 434/22 |
| 4,934,937 | A * | 6/1990 | Judd | 434/21 |
| 5,035,622 | A * | 7/1991 | Marshall et al. | 434/23 |
| 5,215,464 | A | 6/1993 | Marshall et al. | |
| 5,690,492 | A * | 11/1997 | Herald | 434/20 |

(Continued)

FOREIGN PATENT DOCUMENTS

EP        0146466 A        6/1985

(Continued)

*Primary Examiner*—Bernarr E. Gregory
(74) *Attorney, Agent, or Firm*—Townsend and Townsend and Crew, LLP (57) ABSTRACT

Embodiments of the invention, therefore, provide improved systems and methods for tracking targets in a simulation environment. Merely by way of example, an exemplary embodiment provides a reflected laser target tracking system that tracks a target with a video camera and associated computational logic. In certain embodiments, a closed loop algorithm may be used to predict future positions of targets based on formulas derived from prior tracking points. Hence, the target's next position may be predicted. In some cases, targets may be filtered and/or sorted based on predicted positions. In certain embodiments, equations (including without limitation, first order equations and second order equations) may be derived from one or more video frames. Such equations may also be applied to one or more successive frames of video received and/or produced by the system. In certain embodiments, these formulas also may be used to compute predicted positions for targets; this prediction may, in some cases, compensate for inherent delays in the processing pipeline.

21 Claims, 7 Drawing Sheets

U.S. PATENT DOCUMENTS 5,823,779 A * 10/1998 Muehle et al. ................ 434/21
5,980,254 A * 11/1999 Muehle et al. ................ 434/11
6,012,980 A *  1/2000 Yoshida et al. ............... 434/16

FOREIGN PATENT DOCUMENTS

| EP | 0623799 A | 11/1994 |
| EP | 01174674 A | 1/2002 |
| FR | 2840064 A | 11/2003 |
| GB | 2260188 A | 4/1993 |
| WO | WO 94/15165 A | 7/1994 |

* cited by examiner

$$X_c = \sum X_i E_i / \sum E_i$$
$$Y_c = \sum Y_i E_i / \sum E_i$$

ENHANCEMENT OF AIMPOINT IN SIMULATED TRAINING SYSTEMS

CROSS-REFERENCE TO RELATED APPLICATIONS

This application claims priority from co-pending U.S. Provisional Patent Application No. 60/521,877 filed Jul. 15, 2004 by Page and entitled "Aimpoint Enhancement by Means of Extrapolated Movement" which is hereby incorporated by reference, as if set forth in full in this document, for all purposes.

FIELD OF THE INVENTION

This invention relates to a target tracking system and more particularly, to an improvement of target tracking system for tracking multiple targets within a video camera-based weapon aimpoint tracking system.

BACKGROUND OF THE INVENTION

As simulated training becomes ever more important, significant effort has gone into creating and improving simulated training systems. In particular, to provide effective combat training, a premium is placed on target tracking, because without precise target tracking, the value of any training is diminished, since the trainee cannot ascertain accurately whether various techniques provide improved aim.

In the past, many approaches have been used to provide target tracking. Merely by way of example, some systems have used video cameras to provide target tracking. Some such systems, for instance, used the luminance and/or chromance of a video imaged to determine where in a video image a target appears. Such systems may calculate a centroid for the image, for instance by reference to a region defined by matching chromance and/or luminance to pattern values, which might match patterns for flesh tones and/or other applicable patterns. Another type of video tracking system relies on a specified window to isolate regions of interest in order to determine a target. Analog comparison techniques may be used to perform tracking.

In yet another system, a live digitized image is compared with a digitized background image. Based on pixel differences, a centroid for a center of mass of a differenced image is calculated. Velocity of the differenced image may be computed using video frame differences. Other systems use correlation between gated regions on successive frames to match location on a moving region.

Yet another set of tracking systems utilize digital space correlation to suppress false target signals as applied to a point target tracking device. The search field of a tracking system is divided into a matrix of rows and columns of elemental fields of view. Each elemental field view is examined to determine if a target exists in that field and matrix neighbors are compared to determine if target signal exist in adjacent elemental fields. The system rejects a signal if its adjacent matrix neighbor contains a signal.

In some tracking systems, a video processor is coupled to the television camera and limits the system response to signals representative of the inner intensity contour of possible targets. A digital processor responds to the video processor output signals to determine the difference between the angular location of the designated object and a previously stored estimate of this position and then updates the stored position. The updating function is normalized by the target image dimension so that the tracking response of the system is essentially independent of the target image size. The video processor unit eliminates signals which are not representative of a designated target on the basis of signal amplitude comparisons. Digital logic circuits distinguish between the design target and false targets on the basis of angular location.

Such systems, however, fail to provide sufficient precision in determining targets, especially in tracking a target of interest in a field of multiple targets. Further, conventional systems have difficulty effectively predicting the position of targets, especially during periods of intense motion.

BRIEF SUMMARY OF THE INVENTION

Embodiments of the invention, therefore, provide improved systems and methods for tracking targets in a simulation environment. Merely by way of example, an exemplary embodiment provides a reflected laser target tracking system that tracks a target with a video camera and associated computational logic. In certain embodiments, a closed loop algorithm may be used to predict future positions of targets based on formulas derived from prior tracking points. Hence, the target's next position may be predicted. In some cases, targets may be filtered and/or sorted based on predicted positions. In certain embodiments, equations (including without limitation, first order equations and second order equations) may be derived from one or more video frames. Such equations may also be applied to one or more successive frames of video received and/or produced by the system. In certain embodiments, these formulas also may be used to compute predicted positions for targets; this prediction may, in some cases, compensate for inherent delays in the processing pipeline.

One set of embodiments, therefore provides systems for tracking targets. An exemplary system may comprise a video display system, which might be configured to display an image of a target and/or at least one simulated weapon, which might be configured to project an aimpoint on the displayed image. In some embodiments, the system further comprises a video capture system configured to capture a plurality of video frames. Some or all of the video frames may comprise the at least one aimpoint.

Some systems also comprise a computer system, which may be in communication with the video capture system. The computer system often comprises a processor and a computer readable storage medium with instructions executable by the processor. The instructions may be executable to analyze each of the plurality of video frames to determine a position of the aimpoint in each of the plurality of video frames. The instructions may be further executable to determine a formula for the motion of the aimpoint; the formula may be generally satisfied, in some cases, by the position of the aimpoint in at least one of the plurality of video frames. In some embodiments, the formula might be a second order formula, which may account for the position of the aimpoint, the velocity of the aimpoint and the acceleration of the aimpoint.

Perhaps using at least the formula, a position of the aimpoint in a subsequent video frame may be predicted. In particular embodiments, the aimpoint may be identified in a subsequent video frame, based perhaps on a predicted position of the aimpoint. In other embodiments, the aimpoint may be distinguished from among a plurality of aimpoints.

In some cases, predicting the position of the aimpoint in a subsequent video frame may comprise predicting a position of the aimpoint in a second subsequent video frame (again, perhaps with the formula) and averaging a predicted position of the aimpoint in the second subsequent video frame with at least one known position of the aimpoint in at least a current video frame. Based on an average of a predicted position of the aimpoint in the second subsequent video frame and the at least one known position of the aimpoint, a position of the aimpoint in the first subsequent video frame may be predicted. The subsequent video frames need not be contiguous (i.e., there may be one or more intervening frames between the current frame, the subsequent frame and the second subsequent frame).

Another set of embodiments provides methods, including without limitation methods for tracking targeting aimpoints. In an exemplary method, a computer may receive (perhaps from a video capture system) a plurality of video frames. Each of the plurality of video frames might comprise at least one aimpoint projected by a at least one simulated weapon. In some embodiments, the computer analyzes each of the plurality of video frames to determine a position of the aimpoint in each of the plurality of video frames. In other embodiments, the computer might determine a formula for the motion of the aimpoint; the formula may be generally satisfied by the position of the aimpoint in at least one of the plurality of video frames. The computer might also compute tracking the aimpoint across the plurality of video frames.

In another exemplary embodiment, a method is provided for predicting the position of an aimpoint. The method, in some embodiments, comprises a computer receiving (again, perhaps from a video capture system) a plurality of video frames; each of the plurality of video frames may comprise at least one aimpoint projected by a simulated weapon; the plurality of video frames may comprises a current video frame and at least one past video frame. The computer, in some embodiments, analyzes each of the plurality of video frames to determine a plurality of known positions of the aimpoint. The plurality of known positions of the aimpoint might comprise a current known position of the aimpoint in the current video frame and/or at least one historical known position of the aimpoint in the at least one past video frame. In certain embodiments, the computer predicts a position of the aimpoint in a first subsequent video frame, e.g., by averaging, perhaps with weighted average, a predicted position of the aimpoint in a second subsequent video frame with at least one of the plurality of known positions of the aimpoint. The average might be a weighted average, which might depend on a velocity of the aimpoint and/or an acceleration of the aimpoint.

Merely by way of example, if the aimpoint is moving at a relatively high velocity, the plurality of historical known positions of the aimpoint might comprises a relatively greater number of historical known positions of the aimpoint, whereas, if the aimpoint is moving at a relatively low velocity, the plurality of historical known positions of the aimpoint might comprise a relatively smaller number of historical known positions of the aimpoint. As another example, if the velocity of the aimpoint is relatively lower, the weighted average accords the at least one known position of the aimpoint relatively greater weight (e.g., vis-à-vis the predicted position of the aimpoint is the second subsequent video frame).

As yet another example, if the velocity of the aimpoint is relatively lower, the second subsequent video frame may be relatively closer in time to the first subsequent video frame, and if the velocity of the aimpoint is relatively higher, the second subsequent video frame may be relatively further in time from the first subsequent video frame (i.e., when the aimpoint is moving at a relatively higher velocity, the method might extrapolate further into the future to calculate a predicted position, which can then be used for the average).

Other embodiments provide systems, including without limitation systems configured to perform methods of the invention. Still other embodiments provide software programs, including programs embodied on one or more computer-readable media. Some such programs may be executable by computer systems to perform methods of the invention.

A further understanding of the nature and advantages of the present invention may be realized by reference to the remaining portions of the specification and the drawings, wherein like reference numerals are used throughout the several drawings to refer to similar components. In some instances, a sublabel is associated with a reference numeral and is delimited by a hyphen to denote one of multiple similar components. When reference is made to a reference numeral without specification to an existing sublabel, it is intended to refer to all such multiple similar components.

DETAILED DESCRIPTION OF THE INVENTION

Embodiments of the invention, therefore, provide improved systems and methods for tracking targets in a simulation environment. Merely by way of example, an exemplary embodiment provides a reflected laser target tracking system that tracks a target with a video camera and associated computational logic. In certain embodiments, a closed loop algorithm may be used to predict future positions of targets based on formulas derived from prior tracking points. Hence, the target's next position may be predicted. In some cases, targets may be filtered and/or sorted based on predicted positions. In certain embodiments, equations (including without limitation, first order equations and second order equations) may be derived from one or more video frames. Such equations may also be applied to one or more successive frames of video received and/or produced by the system. In certain embodiments, these formulas also may be used to compute predicted positions for targets; this prediction may, in some cases, compensate for inherent delays in the processing pipeline.

In an aspect, certain embodiments of the invention provide improved methods and systems for determining of weapon aimpoint in small arms trainers. In many cases, small arms trainers utilize visible or infra-red ("IR") lasers mounted on the bore of a training weapon to illuminate targets on a projected image of a shooting range. Using feedback from a camera (or any other suitable video capture device), a computer system can identify aimpoints from various weapons, and, in some cases, predict where one or more aimpoints may appear in future video frames, thereby facilitating the identification and tracking of those aimpoints in future frames. In some embodiments, therefore, the aimbeam emissions of various weapons may not need to be pulsed in order to provide for identification of each weapon. (In other embodiments, however, the emissions may still be modulated (i.e., turned on and off) at a specified interval). Merely by way of example, in certain embodiments, the emissions from one or more weapons are modulated at a frequency equivalent to the frame rate of the video capture system, which can facilitate the tracking and/or identification of aimpoints).

Figure 1:
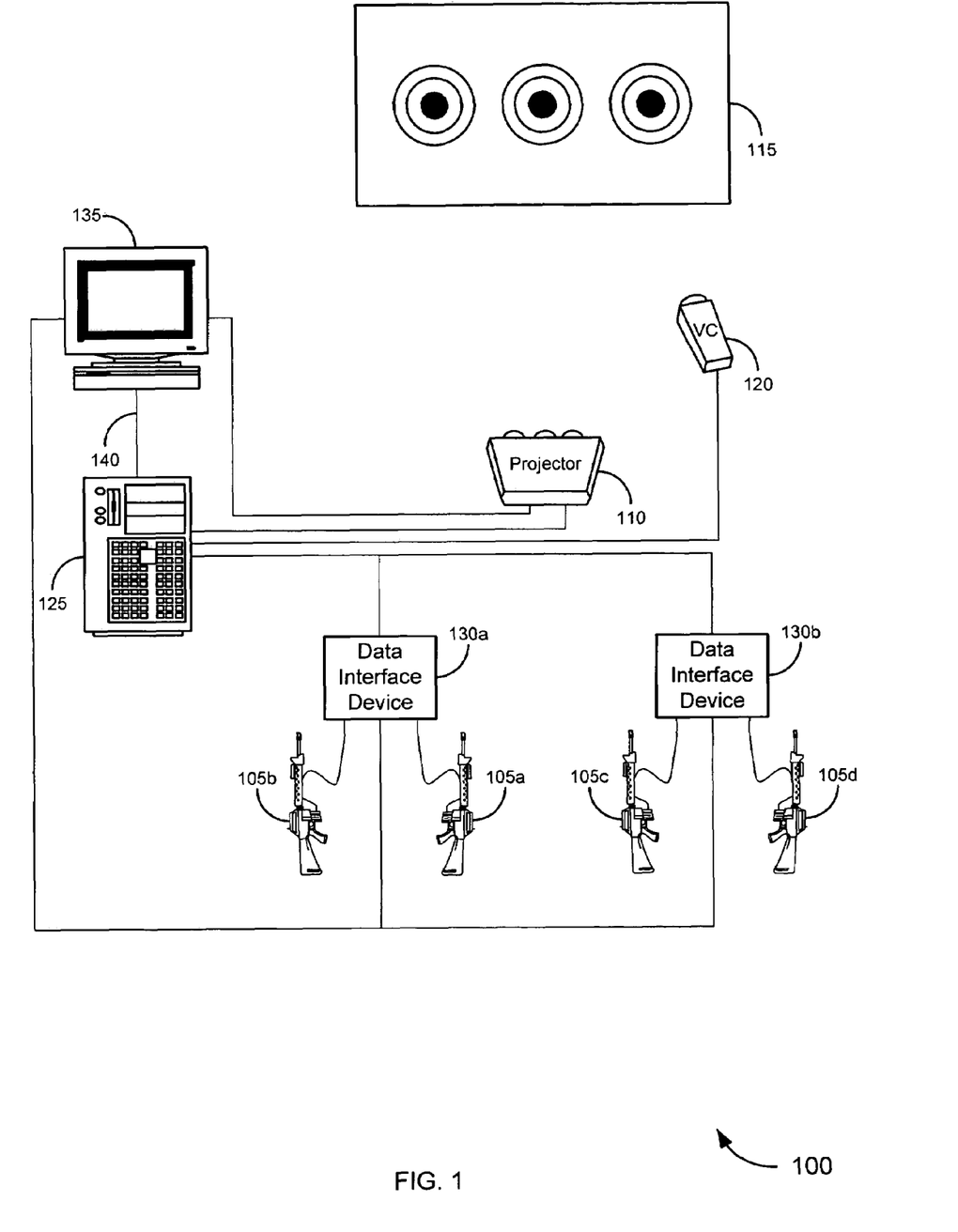
FIG. 1 is a schematic diagram illustrating structural components of a system for tracking targets, in accordance with various embodiments of the invention.

An example of a simulation system 100 may be seen in FIG. 1. The system 100 includes one or more simulated weapons 105b, each of which comprises a device configured to emit an aimbeam (which may be of a frequency that is visible to the human eye or one that is invisible, such as IR), which can be detected by appropriated detection equipment as described below. The aimbeam can be thought of as representing a hypothetical trajectory that a projectile would follow if fired from a simulated weapon (neglecting, in some cases, for ballistic and environmental effects). In some cases, a simulated weapon may be (but is not necessarily) a real weapon that has been reconfigured to emit an aimbeam.

The system 100 also includes a projector 100 that may be configured to display one or more targets on a projection screen 115 (the display may be a moving image—e.g., a video image of one or more moving targets—and/or a static image—e.g., a photograph of one or more targets). When a simulated weapon 105 is aimed at the projection screen 115 and is emitting an aimbeam, the intersection of the aimbeam with the projection screen 115 produces an aimpoint, which is the point at which a hypothetical projectile fired from the simulated weapon 105 would intersect the projection screen 115 (again, in some cases neglecting for ballistic and/or environmental effects). The aimpoint, then, can be detected as a reflection of the aimbeam off of the projection screen 115, as described in more detail below.

The system further includes a video capture device 120, which may be a video camera, a fixed digital imaging device (such as a digital video camera or any other device comprising photocells, one or more charge-coupled devices ("CCD") or similar technology), and/or any other suitable device that can capture video images (or still images at a sufficiently rapid rate) so as to record a location of one or more aimpoints on the projection screen 110. In some cases, the video capture device may be a progressive-scan video camera, which avoids problems with frame interleaving (which are described in further detail below).

The video capture device 120 is disposed so as to capture a video image (and/or a series of still images) of the projection screen. In an aspect of the invention, the video capture device 120 is configured to sense the frequency of the aimbeam/aimpoint (which may be visible or invisible, depending on the embodiment( ). In some embodiments, the video capture device 120 may also be configured to sense visible frequencies, such that the displayed target image (which normally would be visible) is captured by the video capture device 120 as well. (In other embodiments, for example when the aimbeam is not a visible frequency, a plurality of video capture devices 120 may be used, such that one (or more) of the devices 120 capture the target image and one (or more) of the devices 120 capture the aimpoints).

The video capture device 120 is in communication with a tracking computer 125, which can be used to perform methods of the invention as described in further detail below. In particular embodiments, for example, the tracking computer 125 determines where the weapon 105 is pointing on the projected image by identifying the location of the aimpoint. Merely by way of example, the tracking computer 125 might capture an image (such as one or more video frames) from the video capture device 120 and then utilize threshold tests and/or centroid calculations (as described in more detail below, for instance) to determine the position of aimpoints on the projection screen 115 in a particular video frame (or still image). The position might be an absolute position relative to the projection screen 115 and/or the capture frame of the video capture device 120 and/or may be relative to a projected target image.

In a set of embodiments, each of the simulated weapons 105 is in communication with a data interface device 130, which provides data communication between the weapons 105 and the tracking computer 125. In this way, for example, a weapon 105 can communicate to the tracking computer 130 details about the weapon 105, such as when a trigger is pulled, when the weapon is emitting an aimbeam, details about the aimbeam (aimbeam frequency, modulation frequency, etc.) and the like. Likewise, in some embodiments the tracking computer 130 may communicate with a weapon 105 to instruct the weapon to start (or stop) emitting an aimbeam, what aimbeam frequency and/or modulation frequency to use etc.

The term "aimbeam frequency" connotes the frequency of the light emitted from weapon, while the term "modulation frequency" connotes the frequency with which the aimbeam is modulated or pulsed. In some cases, the aimbeam might not be modulated; in other cases, the aimbeam might be modulated at a frequency matching the frame rate of the video capture device, which can assist in the identification of aimpoints. In still other cases, different weapons 105a, 105b might be configured to modulate at different frequencies, to assist in the identification of the aimpoints those weapons. In many embodiments, however, because of the ability of the system 100 to identify aimpoints as described below, this modulation differentiation may be unnecessary.

In some embodiments, the system 100 further comprises a display computer 135 that can be used to display targets, aimpoints, etc. (or, for example, a still and/or video image thereof), e.g., for analysis of trainee performance, etc. The display computer 135 may also be configured to serve as a control workstation for the system (although a separate control workstation (not shown) may be used and/or the tracking computer 125). The display computer 135, then, might be in communication with the tracking computer 135 (e.g., via a network 140, such as an Ethernet network, the Internet, an intranet, a wireless network or any other suitable communication network) (In other cases, the display computer 135 and the tracking computer 125 may be the same computer.) The display computer 135 is also used, in some cases, to provide the projected image to the projector 110. The display computer 135 may be in communication with the data interface device(s) 130, either directly or via the tracking computer 125, such that it may communicate with the weapons 105, perhaps in a manner similar to that described above with respect to the tracking computer 125.

Figure 2:
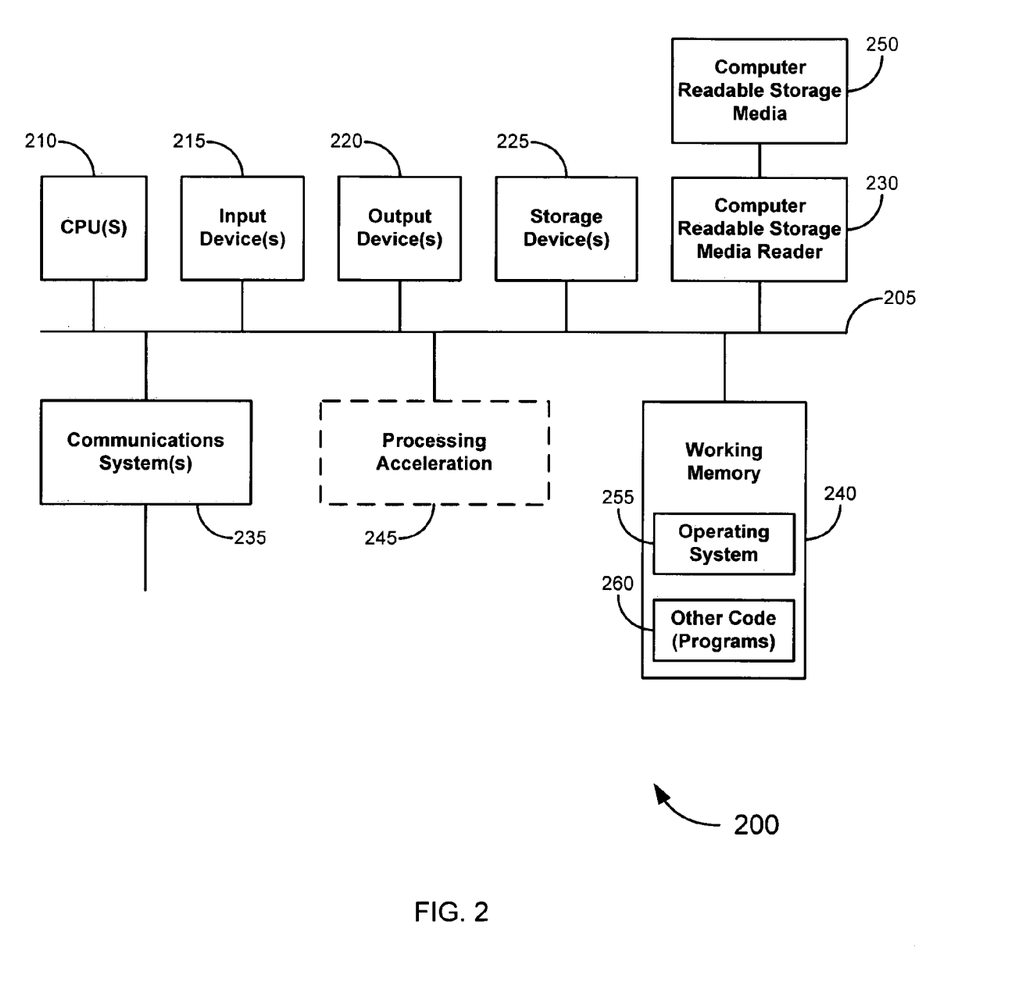
FIG. 2 is a generalized schematic diagram illustrating a computer system, in accordance with various embodiments of the invention.

In accordance with certain embodiments, standard computers and/or devices may be configured for use in the system 100 (e.g., as a tracking computer 125, control workstation, display computer 135 and/or data interface device 130) and/or to implement methods of the invention. FIG. 2 provides a general illustration of one embodiment of a computer system 200, which may be exemplary of any of the computers/devices described above. The computer system 200 is shown comprising hardware elements that may be electrically coupled via a bus 205. The hardware elements may include one or more central processing units (CPUs) 210; one or more input devices 215 (e.g., a mouse, a keyboard, etc.); and/or one or more output devices 220 (e.g., a display device, a printer, etc.). The computer system 200 may also include one or more storage devices 225. By way of example, storage device(s) 225 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 230; one or more communications system(s) 235 (which can include, without limitation, any appropriate inter-device communication facilities, such as serial and/or parallel ports, USB ports, IEEE 1934 ports, modems, network cards and/or chipsets (wireless or wired), infra-red communication devices, and wireless communication systems, including Bluetooth and the like, to name but a few examples); and working memory 240, which may include (without limitation) RAM and ROM devices as described above. In some embodiments, the computer system 200 may also include a processing acceleration unit 245, which can include a DSP, a special-purpose processor and/or the like.

The computer-readable storage media reader 230 can further be connected to a computer-readable storage medium 250, together (and, optionally, in combination with storage device(s) 225) comprehensively representing remote, local, fixed, and/or removable storage devices plus storage media for temporarily and/or more permanently containing computer-readable information. The communications system(s) 235 may permit data to be exchanged with a network (including without limitation the network 145 described above and/or any other computers and/or devices (including without limitation the devices and computers described above with respect to the system 100).

The computer system 200 may also comprise software elements, shown as being currently located within a working memory 240, including an operating system 255 (such as any of the available varieties of Microsoft Windows operating systems, UNIX—or UNIX-like, such as Linux, BSD, etc.—operating systems, mainframe operating systems, etc. The software elements can further include other code 260, such as one or more application programs (which may be an application, etc., configured to perform procedures in accordance with embodiments of the invention, as well as a client application, server application, web browser, web server, mid-tier application, RDBMS, etc.). The application programs may be designed to implement methods of the invention.

It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as a data interface device 130, a projector 110, a video capture device 120, network input/output devices, etc. may be employed using any appropriate standard and/or proprietary connections.

Figure 3:
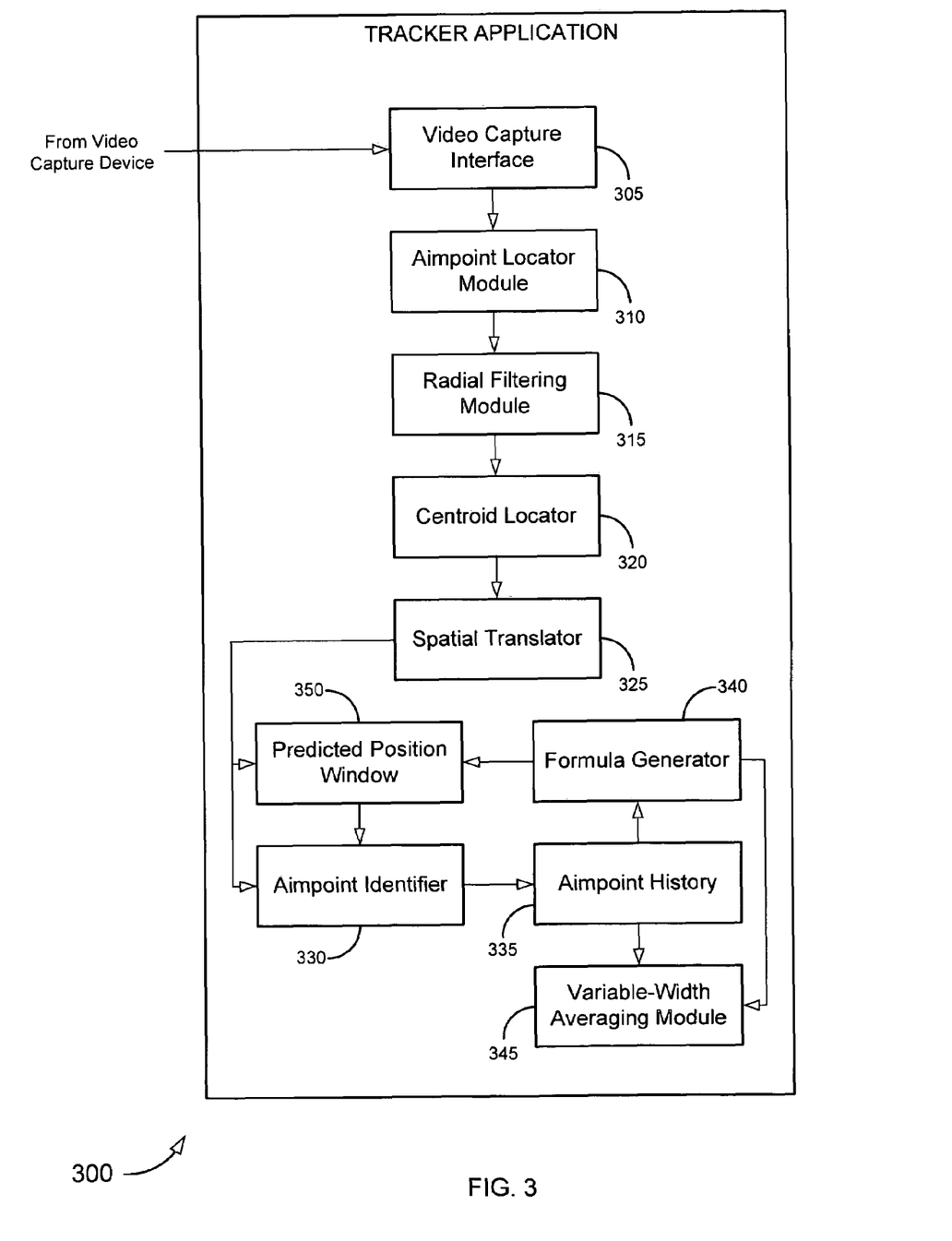
FIG. 3 is a block diagram illustrating functional components of a system for tracking targets, in accordance with various embodiments of the invention.

In a set of embodiments a tracking computer is configured with a software application (and/or a set of software applications) that enable the tracking computer to track and/or identify aimpoints, and to perform other methods of the invention. (In some cases, the software application(s) may be distributed among a plurality of computers, which collectively perform the functions attributed herein to the tracking computer. FIG. 3 illustrates a functional diagram of a tracking application 300 comprising various components that may be included in such application(s), in accordance with some embodiments. (While a particular functional arrangement is illustrated by FIG. 3, it should be appreciated that other embodiments may feature a different arrangement, and one skilled in the art will ascertain, based on the disclosure herein, that functions of the tracking server can be distributed as necessary among any number of software components, applications and/or devices).

In the illustrated embodiments, the tracker application 300 includes a video capture interface 305, which serves to capture video and/or still images from a video capture device. The video capture interface 305 serves to receive the image(s) and/or format the image(s) as necessary for processing by the system. The application 300 also includes a aimpoint locator module 310, which scans the image(s) for patterns matching possible aimpoints. In a set of embodiments the target locator module searches for luminance and/or chromance values matching a set of pattern values (e.g., within a set of defined and/or configurable thresholds).

In accordance with some embodiments, a radial filtering module 315 applies a filtering algorithm to analyze the patterns matching possible aimpoints. In an embodiment, the filtering algorithm compares the algorithms against an expected shape, such that patterns not matching the expected shape and/or size of an aimpoint can be discarded as artifacts of the video capture process. (Although in the described embodiments the aimpoints are expected to be generally radial in shape, other embodiments might employ aimpoints with other shapes, and suitable filtering algorithms may be used to filter based on such shapes.)

Those patterns that are not discarded (or, in embodiments not employing a filtering module, all identified patterns) might thus considered to be valid aimpoints. For one or more of the aimpoints, a centroid locator 320 locates the centroid of the aimpoint, in order to determine precisely the location of the center of the aimpoint. One exemplary embodiment for determining the centroid is described below with respect to FIG. 6. Other procedures may be used as well. The location of the centroid then might be assigned as the position of the position of the aimpoint.

In some embodiments, a spatial translator 325 may be used to correct for any deficiencies in the image capture process. Merely by way of example, there may be lens distortion in the video capture device, such that the captured image does not accurately reflect the actual position of the aimpoint on the projected image. The spatial translator, then, may be one or more formulas (or an array of formulas) that correct for such deficiencies. In many cases, the formula(s) may be determined and/or calibrated based on empirical comparisons of actual aimpoint position with recorded aimpoint position for a particular system. Such formulas (and/or their coefficient), therefore, might be system-specific. (Of course, depending on the optical characteristics of the video capture device, the spatial translator 325 may be unnecessary).

Figure 4:
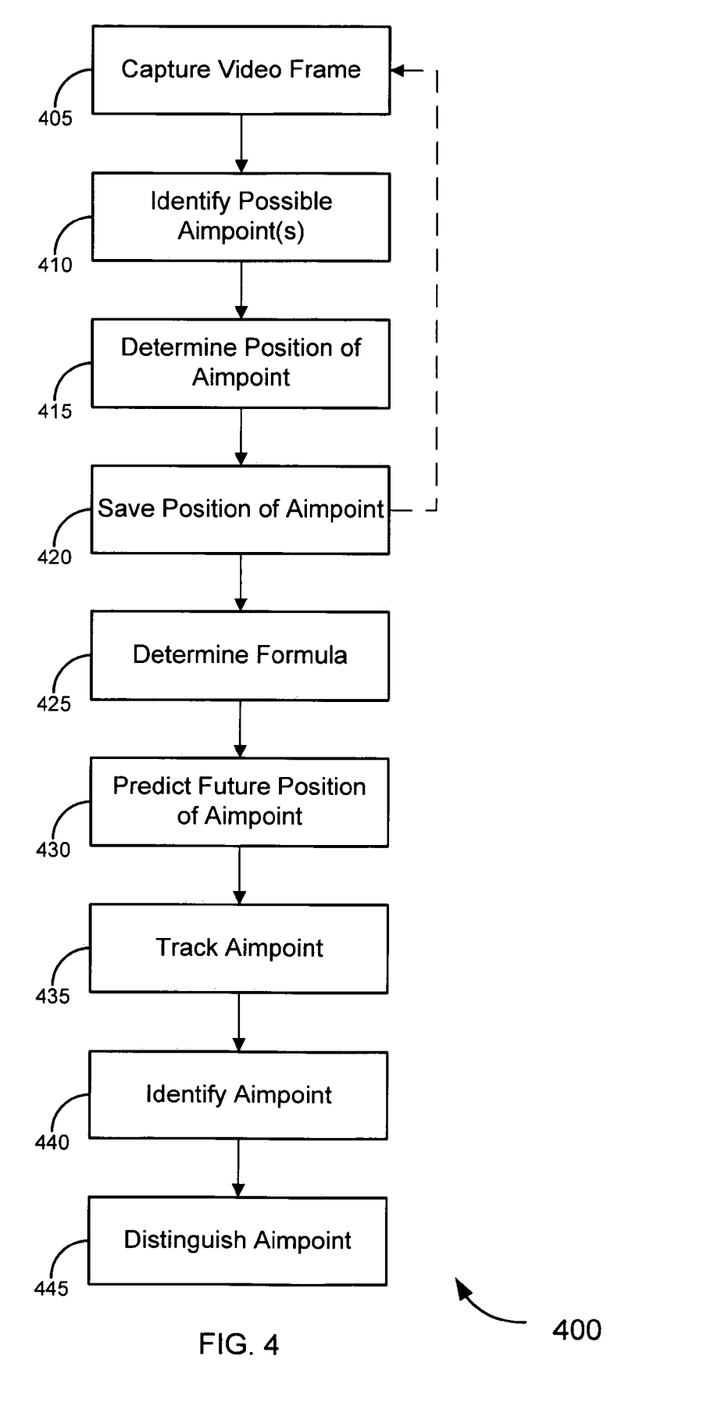
FIG. 4 is a flow diagram of a method of tracking aimpoints, in accordance with various embodiments of the invention.

After undergoing any necessary spatial translation, the recorded aimpoints are processed by an aimpoint identifier 330, which identifies an aimpoint as a specific aimpoint (perhaps among a plurality of aimpoints), using a predicted position window 350 (described in further detail below). FIG. 4, described in detail below, illustrates one exemplary method for identifying an aimpoint. Once an aimpoint is identified, its position is added to an aimpoint history log 335 for that aimpoint. The aimpoint history log 335 (which may be stored in a database, a flat file and/or any other suitable data structure), tracks historical positions of each individual aimpoint (for example, by X, Y coordinates).

Based on the aimpoint history, a formula generator 340 generates a formula describing the motion of a particular aimpoint. In a particular set of embodiments, a formula describing the motion of an aimpoint takes the form of:

$$aT^2+bT+c \qquad (Eq.\ 1)$$

where T is a time value (which may be calculated based on the frame rate of the captured video and/or still images), a is the acceleration (e.g., in pixels per frame), b is the velocity (e.g., in pixels per frame) and c is the original position of the tracked aimpoint. In some embodiments, the motion formula is derived by fitting a curve to a selected number of historical aimpoint positions for the tracked aimpoint (that is, positions stored in the aimpoint history log 335). As described further below, in certain embodiments, the number of historical aimpoints used in generating the formula may vary (for instance, with respect to the current velocity of the aimpoint, and/or based on other factors). In many embodiments, the formula describing the position of any particular aimpoint is updated constantly (i.e., at every captured frame) or frequently.

In a set of embodiments, the generated formula together with the (possibly translated) current position of the aimpoint may be used to determine a predicted position window 350, which is a radius from the current position aimpoint in which a position of the aimpoint in a subsequent frame (which might be, but need not be, the successive frame) may be expected to be found. This predicted position window can be used to identify the aimpoint in a subsequent frame and/or to track the aimpoint, as described in further detail below.

In a set of embodiments, the generated formula and/or the aimpoint history may be provided to a variable-width averaging module 345, which can determine how to weight an average of a predicted position of an aimpoint in a future frame and a set of historical positions for that aimpoint, so as to more accurately predict a future position of the aimpoint. (Merely by way of example, if the current velocity of the aimpoint is relatively low, relatively more historical values may be considered in the average, and/or those historical values may be weighted relatively more heavily (accorded more weight in the average), whereas if the current velocity of the aimpoint is relatively high, then relatively fewer historical positions may be considered, and/or the historical positions may be accorded relatively less weight in the average.

This is based on the principle that if the current velocity is relatively low, it is relatively more likely that the trainee is focusing aim on one point, and variations in velocity or acceleration are more likely to be artifacts of the video capture system and/or involuntary movements of the weapon, such that such variations are relatively less likely to have predictive value. Conversely, if the current velocity is relatively high, it is relatively more likely that the trainee is traversing the aim of the weapon, such that the motion formula is relatively more likely to have predictive value.

Figure 5:
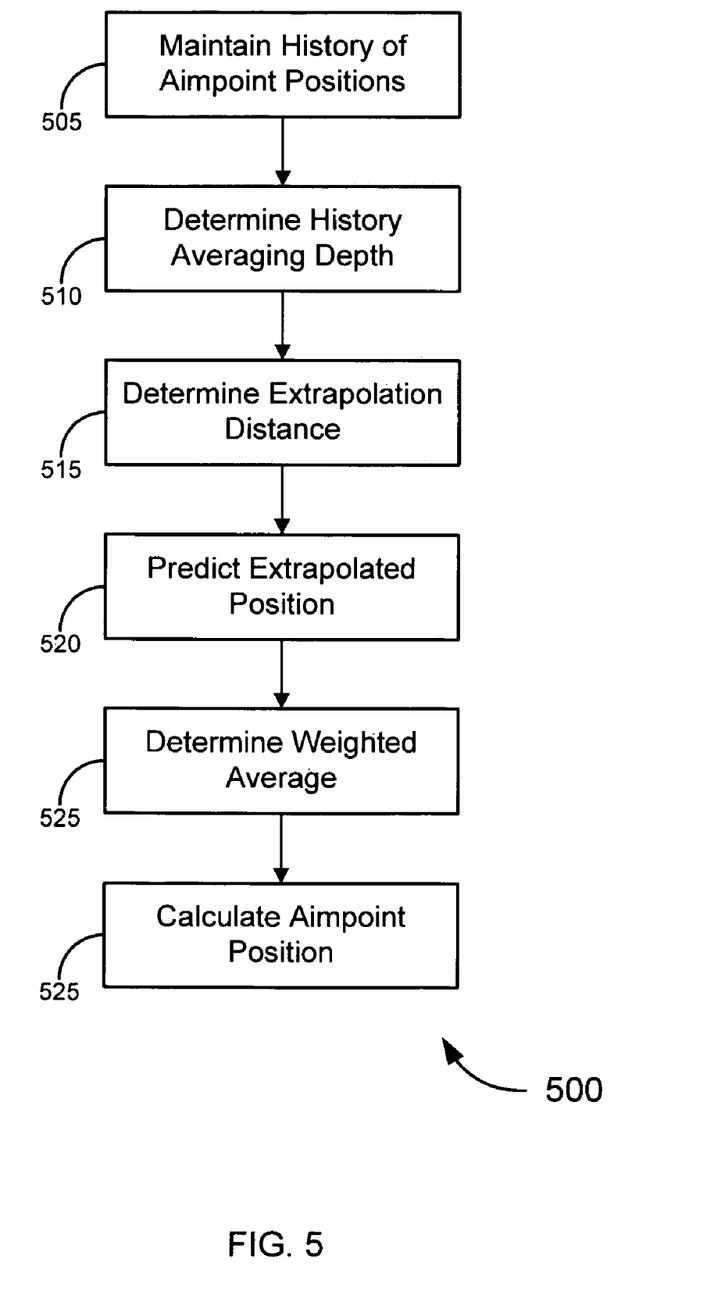
FIG. 5 is a flow diagram illustrating a method of estimating predicted aimpoints, in accordance with various embodiments of the invention.

FIG. 5 describes an exemplary procedure for performing this weighting determination in accordance with certain embodiments of the invention. In some cases, this weighted average can be used to determine a predicted position window, as described above.

It should be appreciated that, while exemplary functional components are illustrated by FIG. 3, one skilled in the art will appreciate that a variety of similar functional components may be substituted for those specifically described above, and/or the organization of components, as noted above, may be modified as appropriate. In particular embodiments, for example, certain functions may not need to be performed and thus may be omitted from the tracking application.

Another set of embodiments provides methods, including without limitation methods of identifying and/or tracking one or more aimpoints. FIG. 4 illustrates an exemplary method 400 in accordance with some embodiments. Methods of the invention, including without limitation those illustrated by FIGS. 4 and 5 may be performed by various components of the system 100 described with respect to FIG. 1 (such as, for example, a tracking computer); it should be appreciated, however, that in other embodiments, different structural systems may be used. The methods of the invention, therefore, are not limited to any particular devices or systems.

The method 400 of FIG. 4 comprises capturing a video frame (block 405). As described above, capturing a video frame (which might be a still image in alternative embodiments) can comprise recording the video frame with a video capture device and/or capturing the recorded frame with a video capture interface of a software application. (In an aspect, the video capture device, the video capture interface and/or a combination of both can be considered a video capture system.) Other procedures might be used as well. Generally, the video frame will comprises at least one aimpoint. (In other words, the captured image includes a depiction or reflection of the aimpoint.) At block 410, one or more possible aimpoints are identified. In a set of embodiments, as described above, a pattern-matching algorithm may be used to compare luminance and/or chromance values of various regions of the captured frame to identify possible aimpoints.

The video frame is then analyzed to determine a position of the aimpoint (block 415). In a set of embodiments, determining the position of the aimpoint might, in various embodiments, comprise one or more procedures, including without limitation filtering possible aimpoints to discard artifacts, locating a centroid of the aimpoint and/or assigning the location of the centroid as the position of the aimpoint and/or performing any necessary spatial translation (e.g. to correct for any deficiencies in the video capture system).

In a set of embodiments, the method 400 further comprises saving the position of the aimpoint (block 420). In some embodiments, the position of the aimpoint is saved in an aimpoint history log, perhaps along with a chronological identifier (which might be a time stamp, frame number, etc.), which can allow for analysis of aimpoint position over a period of time. The procedures at blocks 405-420 then might be repeated, thereby capturing a plurality of video frames and/or developing a historical record of aimpoint positions in each of the plurality of video frames.

At block 425, a formula is determined for the motion of the aimpoint. As described above, in some embodiments, the formula is a second order formula, such as Eq. 1. In certain embodiments, the formula is determined by curve-fitting a selected number of historical positions of the aimpoint (which may or may not include the current position of the aimpoint). In an aspect, then, the formula generally might be satisfied by the position of the aimpoint in one or more previously-recorded video frames.

At block 430, a future position of the aimpoint is predicted. The prediction can be based on the formula for the motion of the aimpoint, on a known position of the aimpoint in one or more previous frames and/or the current frame, and/or on an average of both. In some cases, as described above, the average is a weighted average, and/or the weighting might depend on the motion of the aimpoint (e.g., the velocity of the aimpoint, the acceleration of the aimpoint, etc.). FIG. 5 illustrates an exemplary embodiment of a method of calculating a predicted position based on a weighted average.

In some embodiments, the aimpoint may be tracked (block 435). Merely by way of example, the aimpoints in each of a series of video frames may be used to track an aimpoint across a period of time, allowing for evaluation of a trainee.

In other embodiments, the aimpoint may be identified (block 440). Once a predicted position of an aimpoint has been established, that predicted position may be used to identify the aimpoint in a subsequent frame. For example, as noted above, in some cases, a predicted position window can be calculated for a subsequent frame. An aimpoint falling within that window in the subsequent frame then may be identified as the tracked aimpoint. Moreover if necessary and/or appropriate (for example, if multiple aimpoints fall within the predicted position window), an aimpoint from two or more subsequent frames may be analyzed to determine a motion pattern. If that motion pattern satisfies the motion formula for the tracked aimpoint, the aimpoint in the subsequent frames may be identified as the tracked aimpoint.

In some cases, the predicted position of the aimpoint is used to distinguish the aimpoint from among a plurality of aimpoints (block 445). For example, if there are a plurality of aimpoints located in a given frame, the aimpoint that falls within the predicted position window can be distinguished (as the tracked aimpoint) from those that fall outside the predicted position window.

As noted above, in many cases, a weighted average of the motion formula for an aimpoint and the positional history of the aimpoint may be used to predict a future position of the aimpoint. FIG. 5 illustrates an exemplary method 500 that can determine the weighted average that should be used. The method 500 comprises maintaining a history of aimpoint positions for a particular aimpoint (block 505). The history of aimpoint positions may be maintained in an aimpoint history log, as described above.

At block 510, a history averaging depth is determined. The history averaging depth describes how many known aimpoint positions should be used producing the averaged predicted position. The history averaging depth might be based on a variable-slope aperture window, in which the velocity and/or acceleration of the aimpoint (based, in some cases on a motion formula calculated as described above) determine how much of the position history should be used. Merely by way of example, some embodiments provide that, in cases where the velocity and/or acceleration are relatively small, a relatively greater number of historical positions (that is, positions from past recorded video frames) are used in the averaging history depth.

The method 500 may also include determining an extrapolation distance (block 515). In some embodiments, when the velocity and/or acceleration of the aimpoint is relatively high (as determined by the motion formula for the aimpoint, for example), it is useful to extrapolate several frames into the future to predict a position of the aimpoint. When the velocity and/or acceleration are relatively lower, such extrapolation may not be necessary. Once the extrapolation distance is determined, an extrapolated position is predicted (block 520), using the motion formula for the aimpoint.

At block 525, then, a weighted average is determined. In a set of embodiments, the weighted average will take into account both the history averaging depth and the extrapolation distance. The weighted average thus will depend on the velocity and/or acceleration of the aimpoint. At low velocities, for example, more historical positions will be used in the average, and the extrapolation distance will be shorter. Hence, the motion formula is accorded relatively less weight, and the historical positions are accorded relatively more weight. This can serve to "smooth out" overestimations of positional change that would result from using the motion formula alone, since, as noted above, when the velocity is low, movements are more likely the result of system artifacts and/or small, involuntary movements of the trainee. Conversely, at high velocities, the extrapolation distance increases, and fewer (or no) historical positions are used in the weighted average. This serves to allow the system to more accurately predict a position when the aimpoint is at high velocity, since the motion formula will have relatively greater weight. (In other embodiments, either one of these two measures may be used independently.)

At block 530, the weighted average is used to determine a predicted position (which may be a predicted position window, as described above. This predicted position can be used to track, identify and/or distinguish an aimpoint, as described with respect to FIG. 4. In a set of embodiments, the weighting formulas (that is, the formulas that determine the history averaging depth and/or the extrapolation distance, based on the variable slope aperture window) may be computed at run-time. In other embodiments, the formulas may be pre-computed and/or calibrated, based on system-specific behaviors.

It should be noted that, while for ease of description, the methods 400 and 500 described above refer to the identification and processing of a single aimpoint in each frame, embodiments of the invention can identify, process and/or track a plurality of aimpoints. In fact, one advantage of certain embodiments is the ability to identify/track may aimpoints simultaneously. Merely by way of example, certain embodiments can track over fifteen aimpoints (and, in some cases, well over fifty aimpoints) on a given video image. The number of aimpoints that can be tracked is limited only by the processing power of the system and/or the ability to resolve discrete aimpoints on the video image.

Additionally, various embodiments of the invention provide systems (including without limitation the systems described above) and computer programs that may be configured to implement methods of the invention, including without limitation the methods described with respect to FIGS. 4 and 5.

Figure 6:
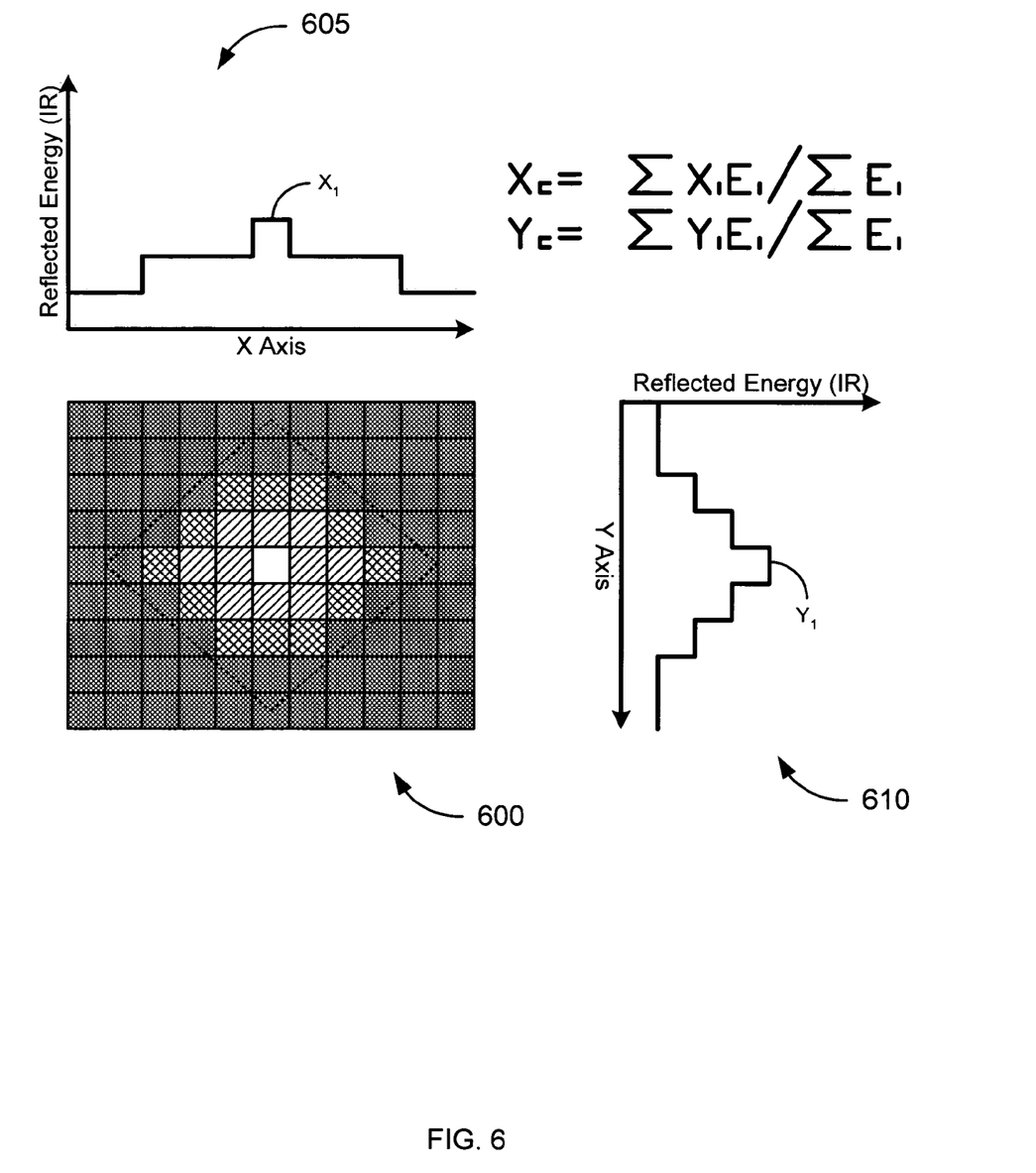
FIG. 6 is an illustration of a centroid of an aimpoint, in accordance with various embodiments of the invention.

As noted above, in many embodiments, a centroid of an aimpoint may be identified. FIG. 6 illustrates an exemplary aimpoint reflection 600 and shows how the centroid may be identified. As shown by the plots 605, 610, the reflected energy (in this example IR energy) may be measured. At a central point $(X_1, Y_1)$ the reflected energy (E) is highest, while the reflected energy decreases with distance from that central point. To find the centroid of the aimpoint, the region surrounding the aimpoint can be broken into regions (as illustrated by the exemplary reflection 600), and the reflected energy $E_i$ can be determined for each region on both the X-axis and the Y-axis. To find the centroid of the aimpoint on each respective axis, the following equations may be used:

$$X_c = \frac{\sum X_i E_i}{\sum E_i} \quad \text{(Eq. 2)}$$

$$Y_c = \frac{\sum Y_i E_i}{\sum E_i} \quad \text{(Eq. 3)}$$

Figure 7:
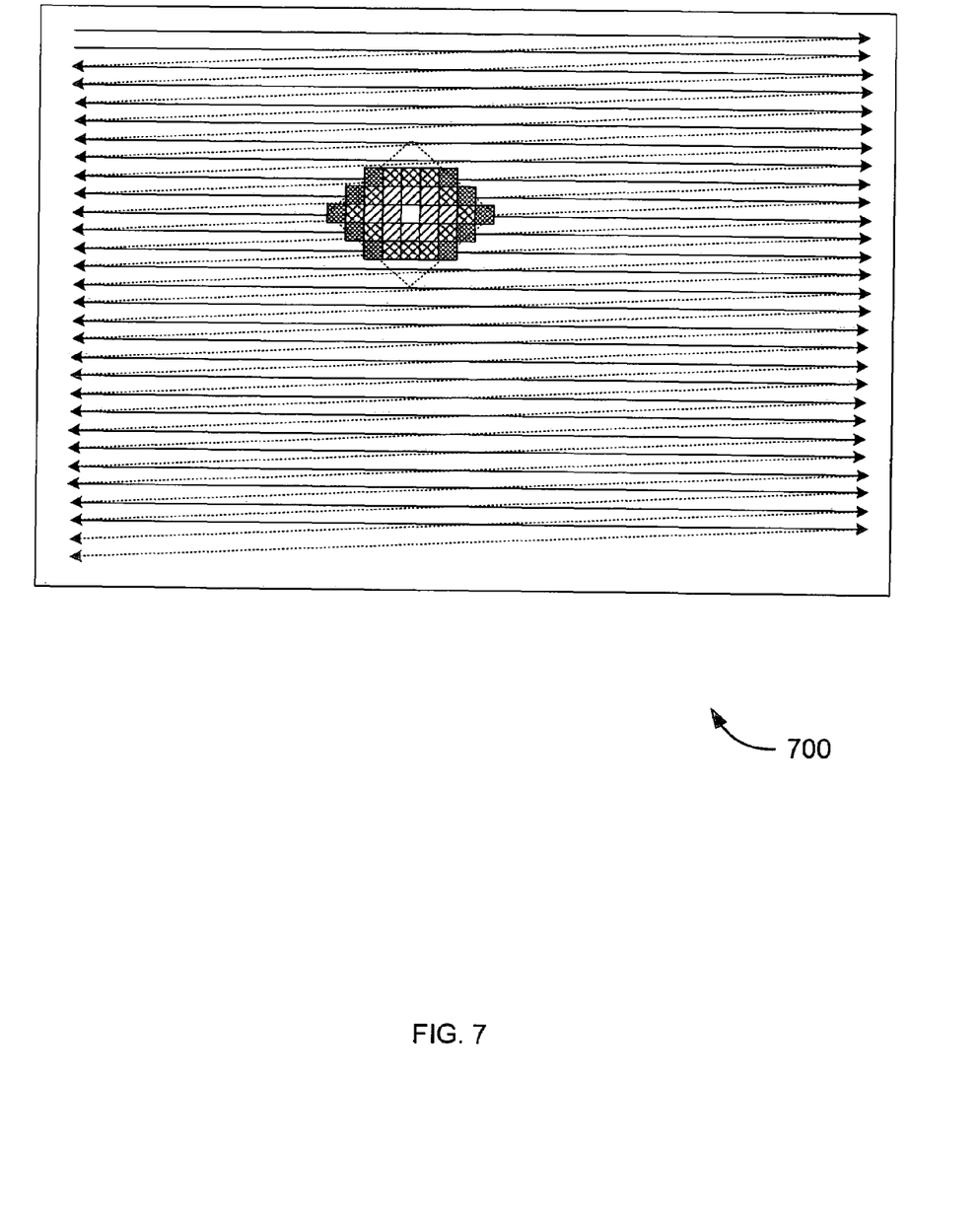
FIG. 7 is an illustration of an aimpoint reflection overlaid on a video image, in accordance with various embodiments of the invention.

Those skilled in the art will appreciate, based on the disclosure herein, that in some embodiments, the video capture device will produce an interlaced video stream. (Other embodiments, however, such as those in which the video capture device is a progressive-scan camera or a fixed digital imaging device, will not produce an interlaced video stream.) Those skilled in the art will further appreciate that an uncorrected interlaced video stream will produce alternating video frames in which the aimpoint is slightly vertically displaced, due to the interlacing effect, as shown by of FIG. 7, which shows an exemplary representation of the aimpoint reflection 700 and how odd and even lines of video return separate portions of the reflection and hence displaced centroids. Embodiments of the invention, therefore, take this displacement into account when identifying possible aimpoints and locating centroids of the aimpoints, for example through corrective filters that are applied to the video image.

In conclusion, embodiments of the invention provide improved tracking and/or identification of aimpoints through the use of, inter alia, generated formulas that predict the position of an aimpoint in a future frame. These generated formulas improve the accuracy of the aimpoint determination by combining the results of multiple frames into accurate formulas of target motion. Applying these formulas, aimpoints may be accurately identified at anytime, including during aimpoint motion. Certain embodiments can provide greatly enhanced accuracy over prior systems.

Further, the generated motion formulas can compensate for pipe-line delays inherent in the capture and computational models. Since the formulas provide an accurate model of a linear system (cantilever motion of the human arm) they may be extrapolated (e.g., in some embodiments, out to up to 20 frames) before inaccuracy of track is observed. Additionally the equations may be rolled to fractional frame positions where user shots were fired providing and exact aimpoint.

Hence, various embodiments of the invention provide inventive methods, systems, and software products that allow for enhanced tracking and/or prediction of weapon aimpoints in simulation environments. Other embodiments, however can implement similar methods, procedures and/or systems of the invention for tracking any appropriate type of target, indicator, etc. Merely by way of example, embodiments of the invention could be used for gaming systems and the like. Hence, while the description above identifies certain exemplary embodiments for implementing the invention, those skilled in the art will recognize that many modifications and variations are possible within the scope of the invention.

It should be noted the described methods and systems are intended to be only exemplary in nature. Consequently, various embodiments may omit, substitute and/or add various procedures and/or components as appropriate. Similarly, in the foregoing description, for the purposes of illustration, various methods were described in a particular order. It should be appreciated that in alternative embodiments, the methods may be performed in an order different than that described. It should also be appreciated that the methods described above may be performed by hardware components and/or may be embodied in sequences of machine-executable instructions, which may be used to cause a machine, such as a general-purpose or special-purpose processor or logic circuits programmed with the instructions, to perform the methods. These machine-executable instructions may be stored on one or more machine readable media, such as CD-ROMs or other type of optical disks, floppy diskettes, ROMs, RAMs, EPROMs, EEPROMs, magnetic or optical cards, flash memory, or other types of machine-readable media suitable for storing electronic instructions. Merely by way of example, some embodiments of the invention provide software programs, which may be executed on one or more computers, for performing the methods described above. In particular embodiments, for example, there may be a plurality of software components configured to execute on various hardware devices. Alternatively, the methods may be performed by a combination of hardware and software.

Hence, while the description above identifies certain exemplary embodiments for implementing the invention, those skilled in the art will recognize that many modifications and variations are possible within the scope of the invention. The invention, therefore, is defined only by the claims set forth below.

What is claimed is:

1. A method of predicting the position of an aimpoint in a simulation environment, the method comprising:
    a computer receiving from a video capture system a plurality of video frames, wherein each of the plurality of video frames comprises at least one aimpoint projected by a simulated weapon, and wherein the plurality of video frames comprises a current video frame and at least one past video frame;
    the computer analyzing each of the plurality of video frames to determine a plurality of known positions of the aimpoint, the plurality of known positions of the aimpoint comprising a current known position of the aimpoint in the current video frame and at least one historical known position of the aimpoint in the at least one past video frame; and
    the computer predicting a position of the aimpoint in a first subsequent video frame by averaging a predicted position of the aimpoint in a second subsequent video frame with at least one of the plurality of known positions of the aimpoint.

2. The method recited in claim 1, wherein the at least one historical known position of the aimpoint comprises a plurality of historical known positions of the aimpoint, and wherein:
    if the aimpoint is moving at a relatively high velocity, the plurality of historical known positions of the aimpoint comprises a relatively greater number of historical known positions of the aimpoint; and
    if the aimpoint is moving at a relatively low velocity, the plurality of historical known positions of the aimpoint comprises a relatively smaller number of historical known positions of the aimpoint.

3. The method recited in claim 1, wherein the average of the predicted position of the aimpoint in the second subsequent video frame and the at least one known position of the aimpoint is a weighted average.

4. The method recited in claim 3, wherein the weighted average depends on an acceleration of the aimpoint.

5. The method recited in claim 3, wherein the weighted average depends on a velocity of the aimpoint.

6. The method recited in claim 5, wherein if the velocity of the aimpoint is relatively lower, the weighted average accords the at least one known position of the aimpoint relatively greater weight.

7. The method recited in claim 5, wherein if the velocity of the aimpoint is relatively lower, the second subsequent video frame is relatively closer in time to the first subsequent video frame, and wherein if the velocity of the aimpoint is relatively higher, the second subsequent video frame is relatively further in time from the first subsequent video frame.

8. A system for predicting the position of an aimpoint in a simulation environment, the system comprising:
a processor; and
a computer readable medium in communication with the processor, the computer readable medium comprising a set of instructions executable by the computer, the set of instructions comprising,
instructions for receiving from a video capture system a plurality of video frames, wherein each of the plurality of video frames comprises at least one aimpoint projected by a simulated weapon, and wherein the plurality of video frames comprises a current video frame and at least one past video frame;
instructions for analyzing each of the plurality of video frames to determine a plurality of known positions of the aimpoint, the plurality of known positions of the aimpoint comprising a current known position of the aimpoint in the current video frame and at least one historical known position of the aimpoint in the at least one past video frame; and
instructions for predicting a position of the aimpoint in a first subsequent video frame by averaging a predicted position of the aimpoint in a second subsequent video frame with at least one of the plurality of known positions of the aimpoint.

9. The system recited in claim 8, wherein the at least one historical known position of the aimpoint comprises a plurality of historical known positions of the aimpoint, and wherein:
if the aimpoint is moving at a relatively high velocity, the plurality of historical known positions of the aimpoint comprises a relatively greater number of historical known positions of the aimpoint; and
if the aimpoint is moving at a relatively low velocity, the plurality of historical known positions of the aimpoint comprises a relatively smaller number of historical known positions of the aimpoint.

10. The system recited in claim 8, wherein the average of the predicted position of the aimpoint in the second subsequent video frame and the at least one known position of the aimpoint is a weighted average.

11. The system recited in claim 10, wherein the weighted average depends on an acceleration of the aimpoint.

12. The system recited in claim 10, wherein the weighted average depends on a velocity of the aimpoint.

13. The system recited in claim 12, wherein if the velocity of the aimpoint is relatively lower, the weighted average accords the at least one known position of the aimpoint relatively greater weight.

14. The system recited in claim 12, wherein if the velocity of the aimpoint is relatively lower, the second subsequent video frame is relatively closer in time to the first subsequent video frame, and wherein if the velocity of the aimpoint is relatively higher, the second subsequent video frame is relatively further in time from the first subsequent video frame.

15. An apparatus, comprising:
a computer readable storage medium encoded with a computer program, the computer program comprising a set of instructions executable by a computer, the set of instructions comprising:
instructions for receiving from a video capture system a plurality of video frames, wherein each of the plurality of video frames comprises at least one aimpoint projected by a simulated weapon, and wherein the plurality of video frames comprises a current video frame and at least one past video frame;
instructions for analyzing each of the plurality of video frames to determine a plurality of known positions of the aimpoint, the plurality of known positions of the aimpoint comprising a current known position of the aimpoint in the current video frame and at least one historical known position of the aimpoint in the at least one past video frame; and
instructions for predicting a position of the aimpoint in a first subsequent video frame by averaging a predicted position of the aimpoint in a second subsequent video frame with at least one of the plurality of known positions of the aimpoint.

16. The apparatus recited in claim 15, wherein the at least one historical known position of the aimpoint comprises a plurality of historical known positions of the aimpoint, and wherein:
if the aimpoint is moving at a relatively high velocity, the plurality of historical known positions of the aimpoint comprises a relatively greater number of historical known positions of the aimpoint; and
if the aimpoint is moving at a relatively low velocity, the plurality of historical known positions of the aimpoint comprises a relatively smaller number of historical known positions of the aimpoint.

17. The apparatus recited in claim 15, wherein the average of the predicted position of the aimpoint in the second subsequent video frame and the at least one known position of the aimpoint is a weighted average.

18. The apparatus recited in claim 17, wherein the weighted average depends on an acceleration of the aimpoint.

19. The apparatus recited in claim 17, wherein the weighted average depends on a velocity of the aimpoint.

20. The apparatus recited in claim 19, wherein if the velocity of the aimpoint is relatively lower, the weighted average accords the at least one known position of the aimpoint relatively greater weight.

21. The apparatus recited in claim 19, wherein if the velocity of the aimpoint is relatively lower, the second subsequent video frame is relatively closer in time to the first subsequent video frame, and wherein if the velocity of the aimpoint is relatively higher, the second subsequent video frame is relatively further in time from the first subsequent video frame.

* * * * *